US012800890B2

(12) United States Patent
Iwamoto

(10) Patent No.: US 12,800,890 B2
(45) Date of Patent: Nov. 17, 2026

(54) ZOOM LENS, IMAGE PICKUP APPARATUS, AND IMAGE PICKUP SYSTEM

(71) Applicant: CANON KABUSHIKI KAISHA, Tokyo (JP)

(72) Inventor: Shunji Iwamoto, Tochigi (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 523 days.

(21) Appl. No.: 18/493,844

(22) Filed: Oct. 25, 2023

(65) Prior Publication Data

US 2024/0159996 A1 May 16, 2024

(30) Foreign Application Priority Data

Nov. 16, 2022 (JP) ................................ 2022-183286

(51) Int. Cl.
*G02B 15/14* (2006.01)
*G02B 15/167* (2006.01)
*G02B 15/177* (2006.01)

(52) U.S. Cl.
CPC .... *G02B 15/144511* (2019.08); *G02B 15/167* (2013.01); *G02B 15/177* (2013.01)

(58) Field of Classification Search
CPC .......... G02B 15/144511; G02B 15/167; G02B 15/177
See application file for complete search history.

(56) References Cited

U.S. PATENT DOCUMENTS 9,217,851 B2 12/2015 Iwamoto
10,078,202 B2 9/2018 Iwamoto
10,416,421 B2 9/2019 Iwamoto
10,663,703 B2 5/2020 Iwamoto
10,754,169 B2 8/2020 Iwamoto
11,131,829 B2 9/2021 Iwamoto
11,181,717 B2 11/2021 Iwamoto
2014/0055659 A1 2/2014 Iwamoto
2022/0043243 A1 2/2022 Iwamoto
2023/0010047 A1 1/2023 Iwamoto
(Continued)

FOREIGN PATENT DOCUMENTS

JP 2011-237737 A 11/2011
WO 2024053269 A1 3/2024

OTHER PUBLICATIONS

Notice of Reasons for Refusal issued by the Japanese Patent Office on Aug. 18, 2026 in corresponding JP Patent Application No. 2022-183286, with English translation.

*Primary Examiner* — Jack Dinh
(74) *Attorney, Agent, or Firm* — Carter, DeLuca & Farrell LLP

(57) ABSTRACT

A zoom lens includes a plurality of lens units that consist of, in order from an object side to an image side, a first lens unit having negative refractive power, a second lens unit having positive refractive power, a third lens unit having negative refractive power, and a fourth lens unit having positive refractive power. A distance between adjacent lens units changes during zooming from a wide-angle end to a telephoto end. During zooming from a wide-angle end to a telephoto end, the first lens unit and the fourth lens unit are fixed relative to an image plane, and the third lens unit moves to the object side. During focusing from infinity to a shortest distance, the first lens unit is fixed relative to the image plane. The second lens unit consists of four or more spherical lenses. A predetermined inequality is satisfied.

20 Claims, 11 Drawing Sheets

(56) References Cited

U.S. PATENT DOCUMENTS

| | | | |
|---|---|---|---|
| 2023/0266583 | A1 | 8/2023 | Iwamoto |
| 2023/0384570 | A1 | 11/2023 | Iwamoto |
| 2024/0053591 | A1 | 2/2024 | Iwamoto |
| 2024/0061224 | A1 | 2/2024 | Iwamoto |

ZOOM LENS, IMAGE PICKUP APPARATUS, AND IMAGE PICKUP SYSTEM

BACKGROUND

Technical Field

One of the aspects of the embodiments relates to a zoom lens, an image pickup apparatus, and an image pickup system.

Description of Related Art

A zoom lens for an image pickup apparatus is demanded to have a compact size, reduced weight, and high optical performance in which various aberrations including chromatic aberration are satisfactorily corrected. The zoom lens is also demanded to have a short focal length at the wide-angle end, to be easy to manufacture, and to be less expensive. The zoom lens is also demanded to provide a high-speed zoom operation.

The arrangement of one or more aspheric lenses is important for such a zoom lens. In a case where an aspheric lens is placed in a second lens unit located on an image side of a first lens unit closest to an object and having a high on-axis ray height, the required accuracy of the aspheric lens increases, manufacturing difficulty increases, and it becomes difficult to provide a less expensive zoom lens. On the other hand, in a case where an aspheric lens is not placed in the second lens unit, it becomes difficult to suppress the aberration generated in the second lens unit, and high image quality becomes difficult. For the zoom lens that can provide high-speed zoom operation, it is effective to fix the first lens unit with a large lens diameter and to move only lens units with small lens diameters. However, fixing the first lens unit closest to the object deteriorates aberration correction, and it becomes difficult to improve the image quality.

Japanese Patent Laid-Open No. 2011-237737 discloses a compact and lightweight zoom lens that consists of, in order from the object side, a first lens unit having negative refractive power, a second lens unit having positive refractive power, and a third lens unit having negative refractive power, and a fourth lens unit having positive refractive power. The first lens unit is fixed relative to the image plane during zooming.

However, the zoom lens disclosed in Japanese Patent Laid-Open No. 2011-237737 has the above problems because the aspheric lens is placed in the second lens unit.

SUMMARY

A zoom lens according to one aspect of the embodiment includes a plurality of lens units that consist of, in order from an object side to an image side, a first lens unit having negative refractive power, a second lens unit having positive refractive power, a third lens unit having negative refractive power, and a fourth lens unit having positive refractive power. A distance between adjacent lens units changes during zooming from a wide-angle end to a telephoto end. During zooming from a wide-angle end to a telephoto end, the first lens unit and the fourth lens unit are fixed relative to an image plane, and the third lens unit moves to the object side. During focusing from infinity to a shortest distance, the first lens unit is fixed relative to the image plane. The second lens unit consists of four or more spherical lenses. The following inequalities are satisfied:

$$0.7<-f1/f2<1.5$$

2

$$0.1<-f2/f3<0.9$$

where f1 is a focal length of the first lens unit, f2 is a focal length of the second lens unit, and f3 is a focal length of the third lens unit. An image pickup apparatus and an image pickup system each having the above zoom lens also constitutes another aspect of the embodiment.

Further features of the disclosure will become apparent from the following description of embodiments with reference to the attached drawings.

DESCRIPTION OF THE EMBODIMENTS

Figure 1:
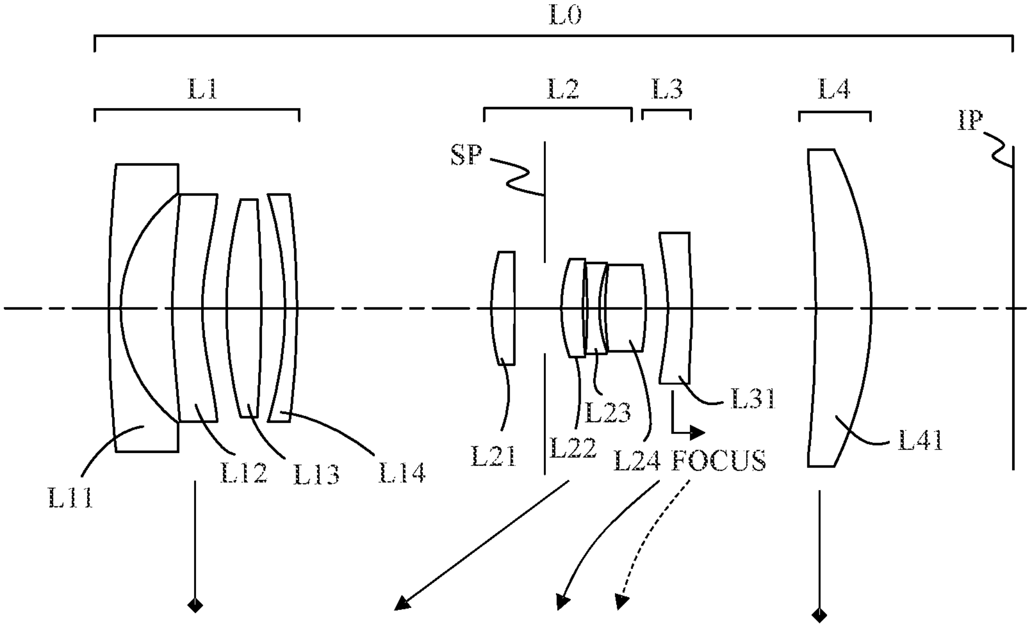
FIG. 1 is a sectional view of a zoom lens according to Example 1.
Figure 2A:
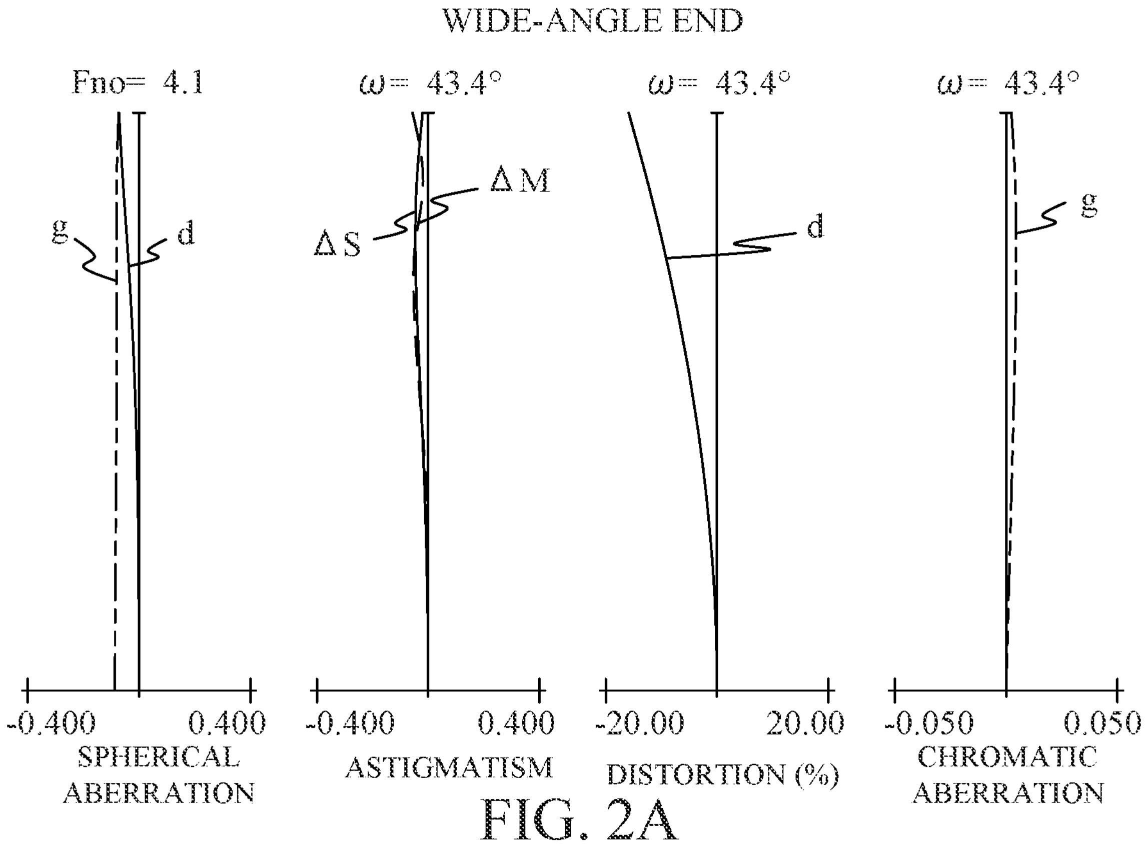
FIGS. 2A and 2B are aberration diagrams of the zoom lens according to Example 1.
Figure 2B:
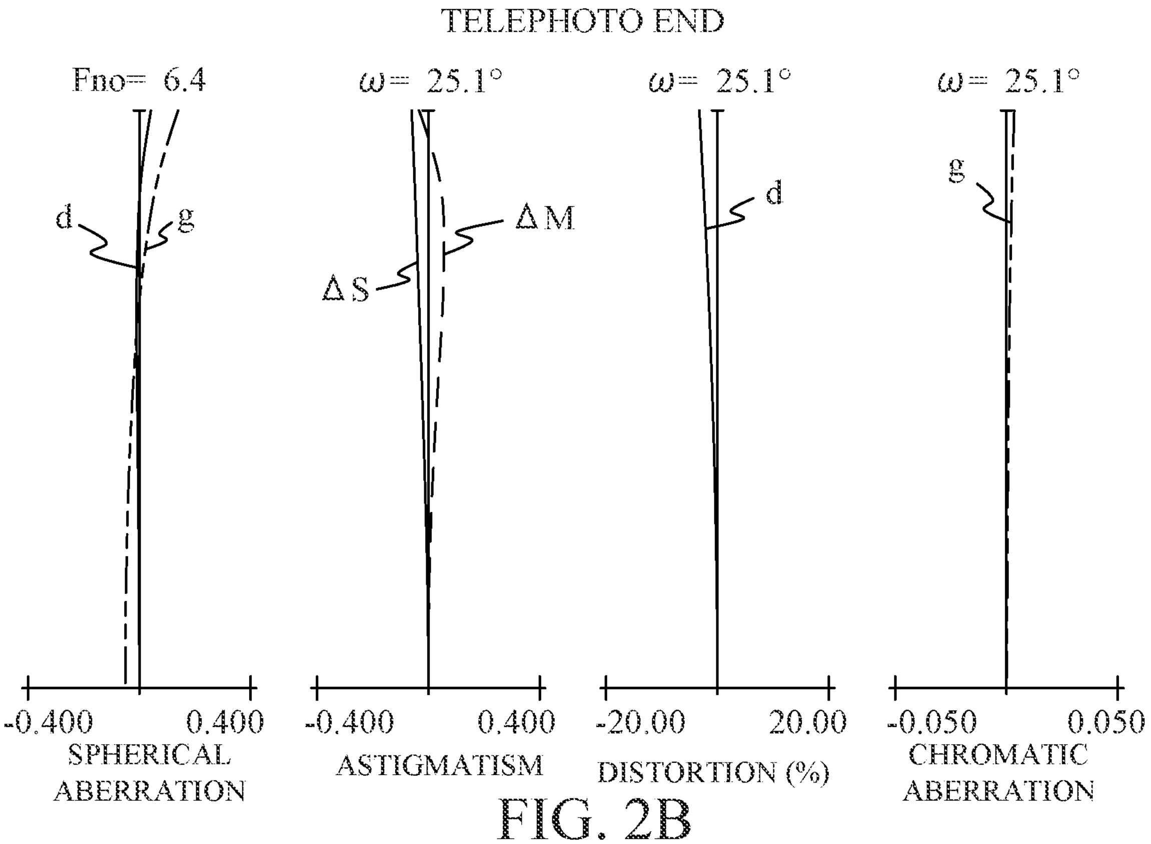
Figure 3:
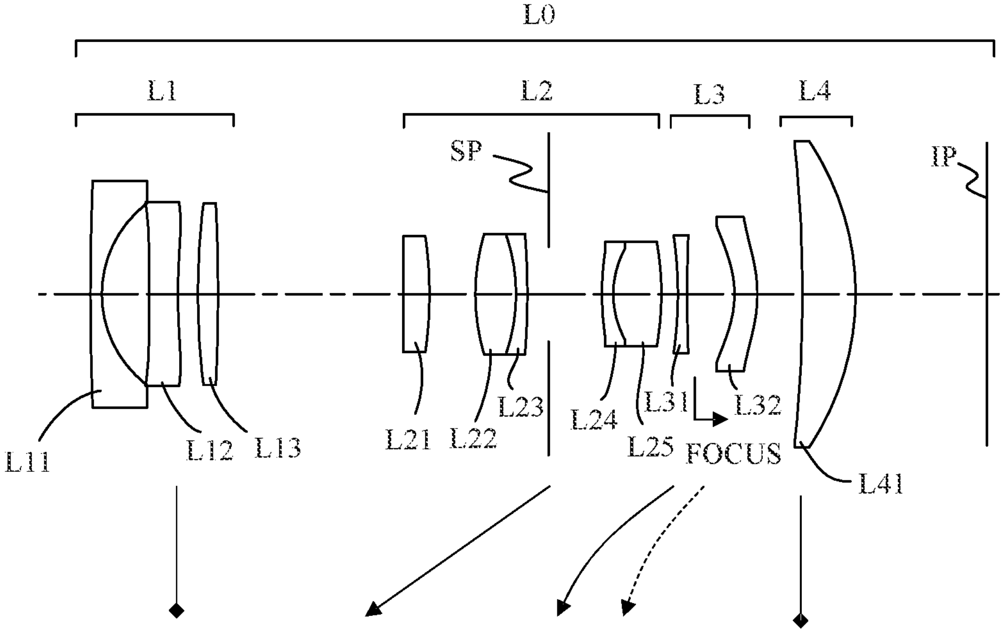
FIG. 3 is a sectional view of a zoom lens according to Example 2.
Figure 4A:
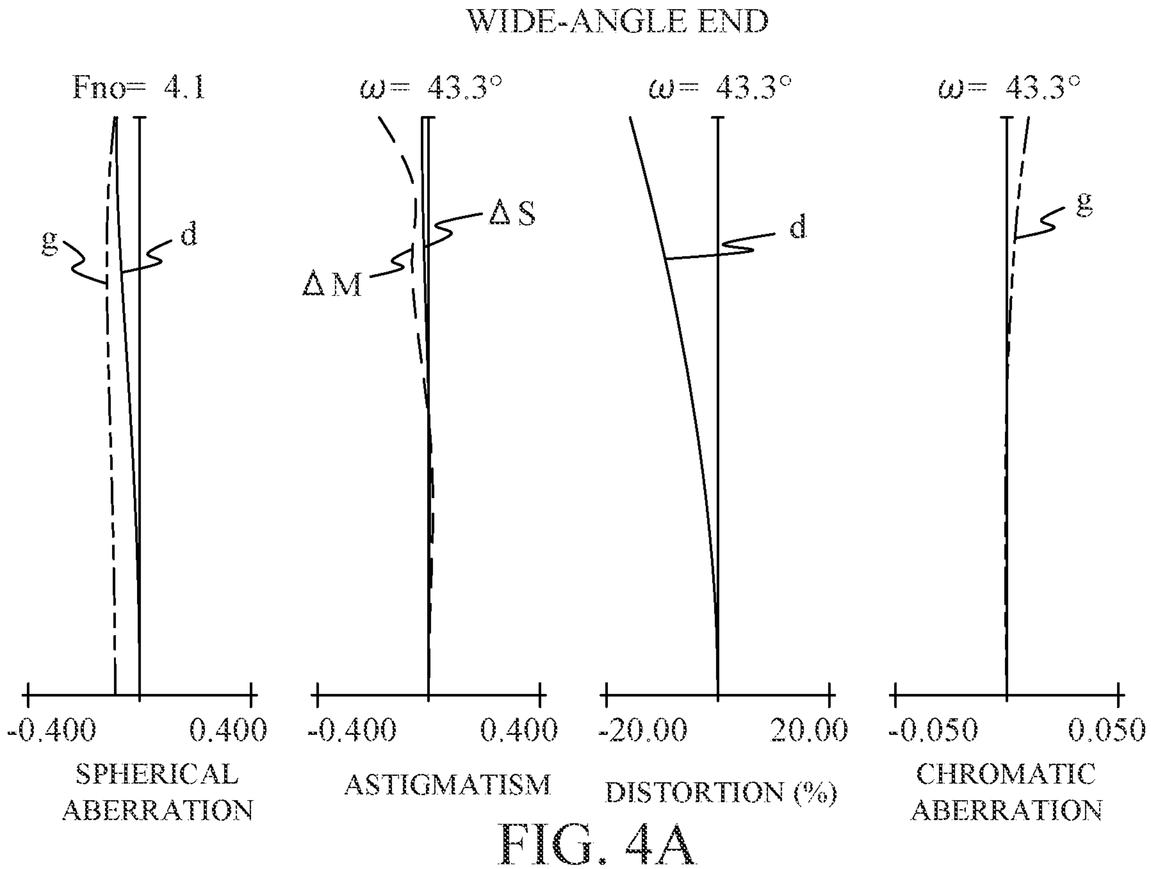
FIGS. 4A and 4B are aberration diagrams of the zoom lens according to Example 2.
Figure 4B:
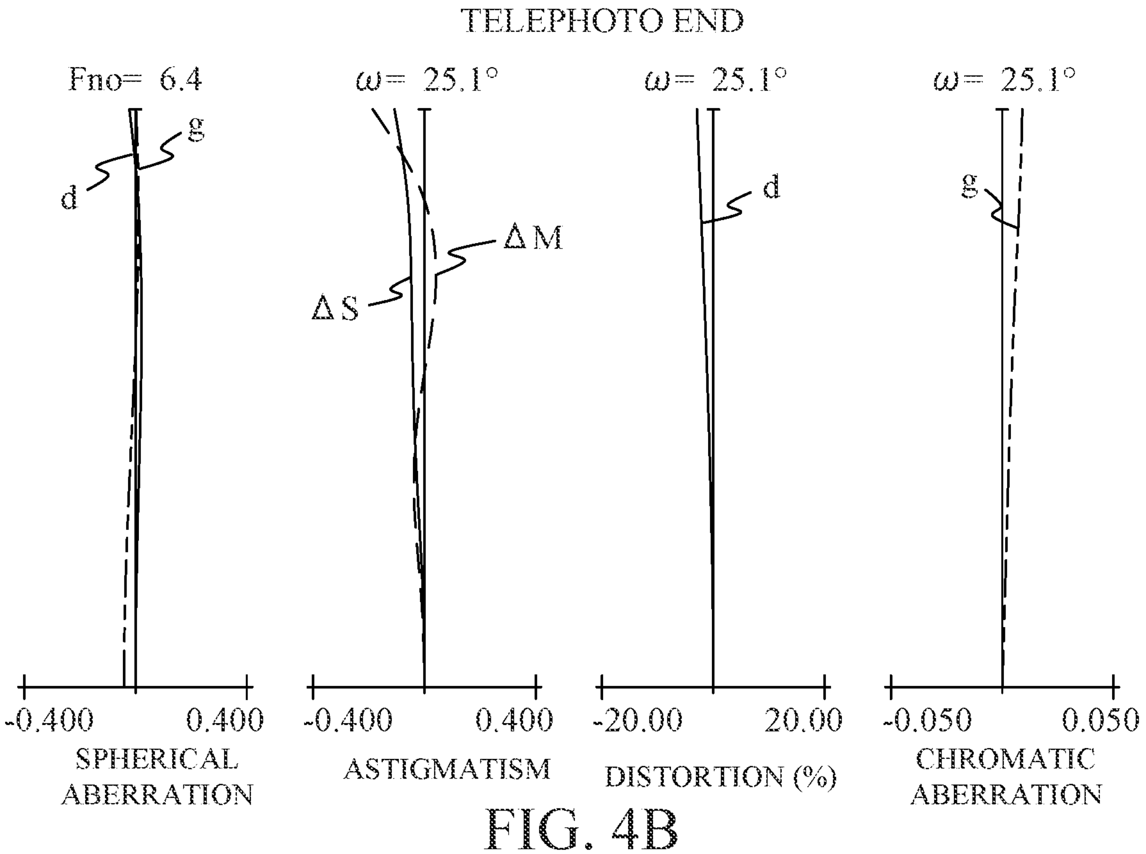
Figure 5:
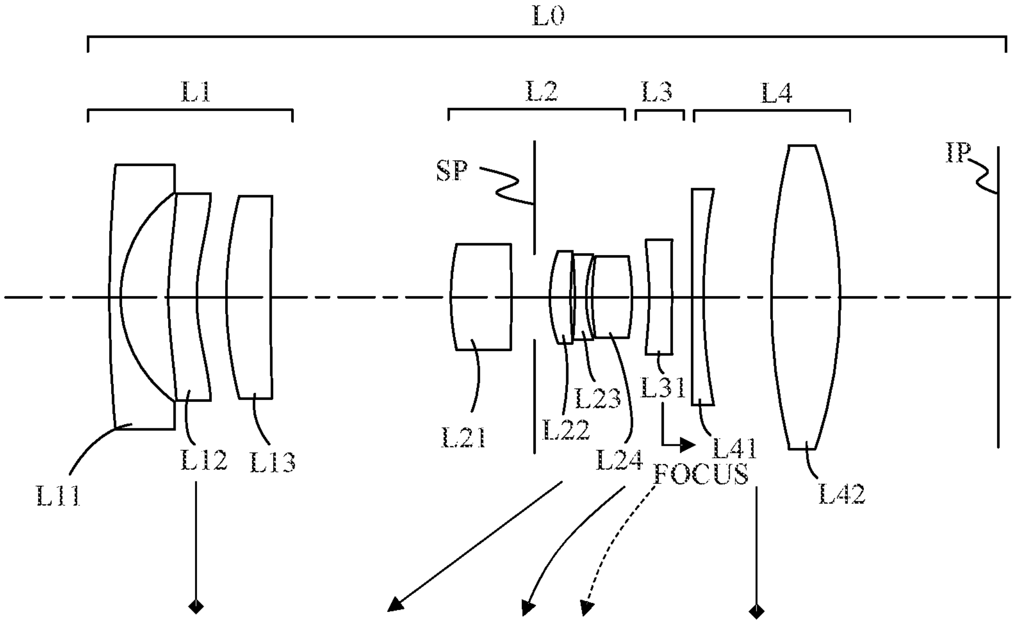
FIG. 5 is a sectional view of a zoom lens according to Example 3.
Figure 6A:
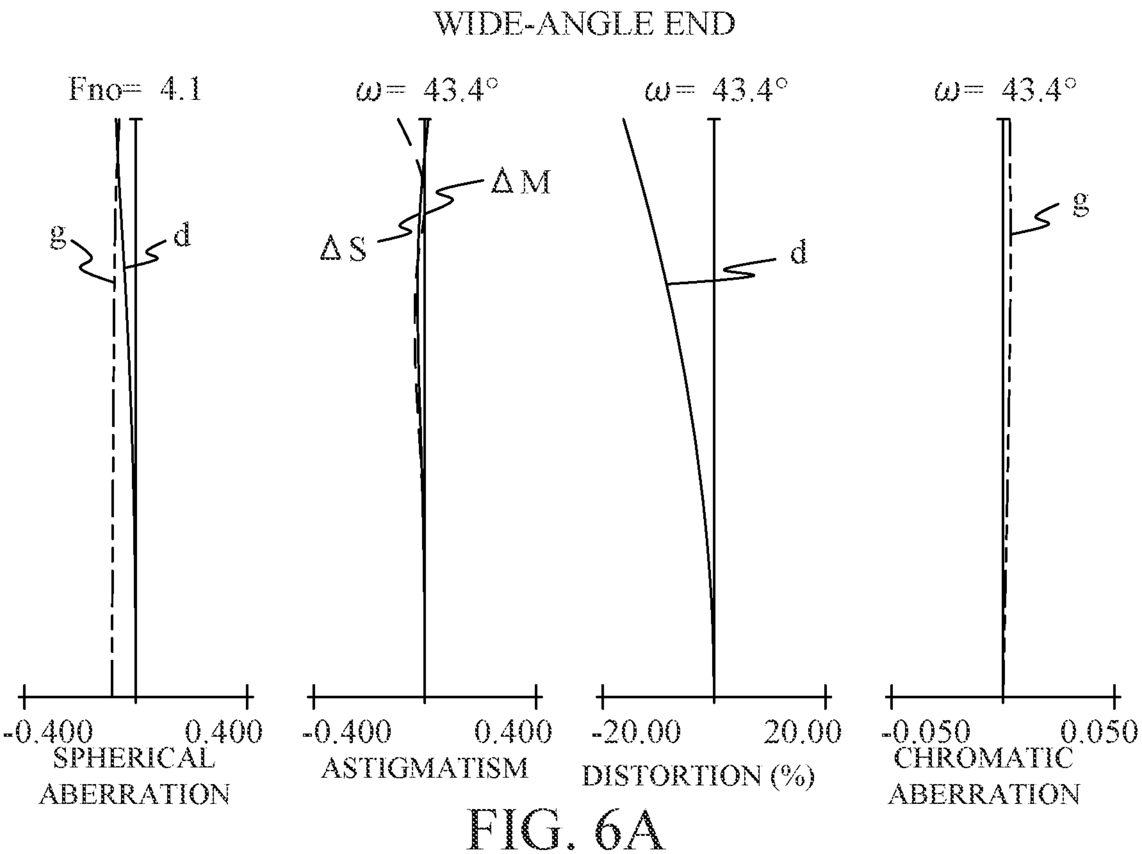
FIGS. 6A and 6B are aberration diagrams of the zoom lens according to Example 3.
Figure 6B:
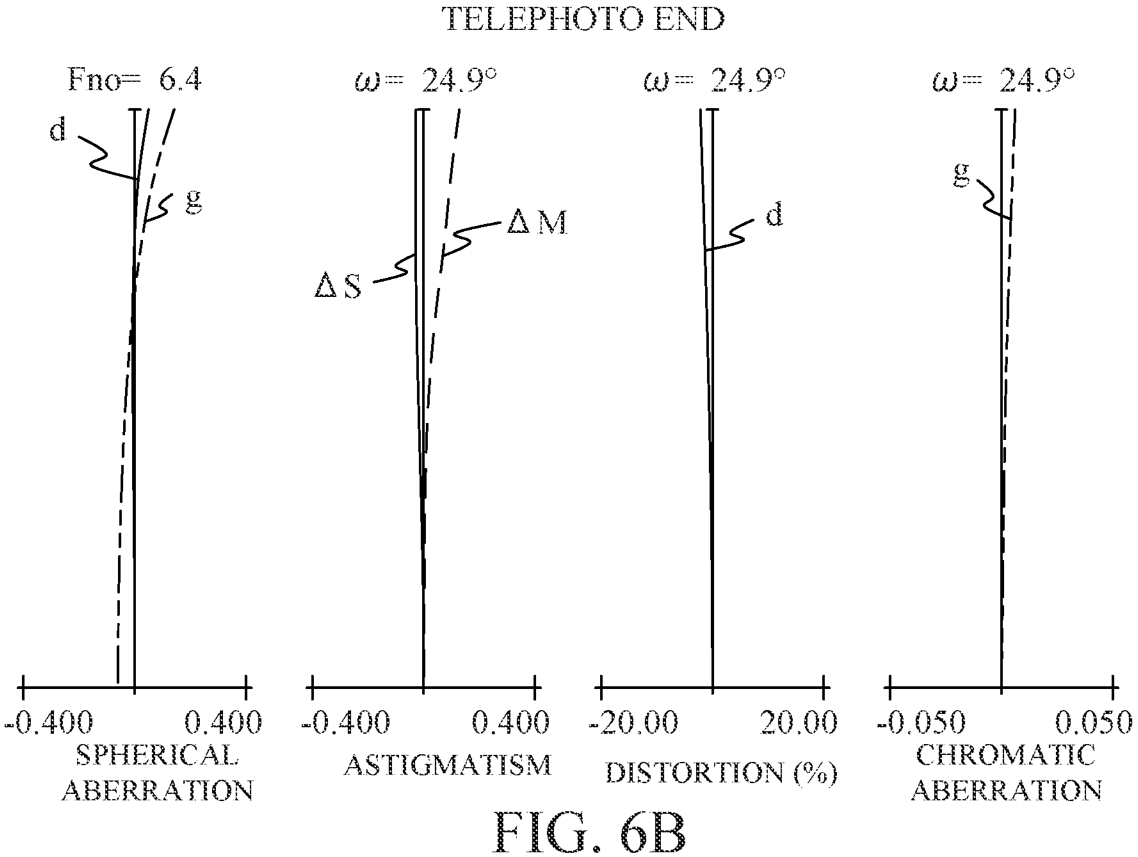
Figure 7:
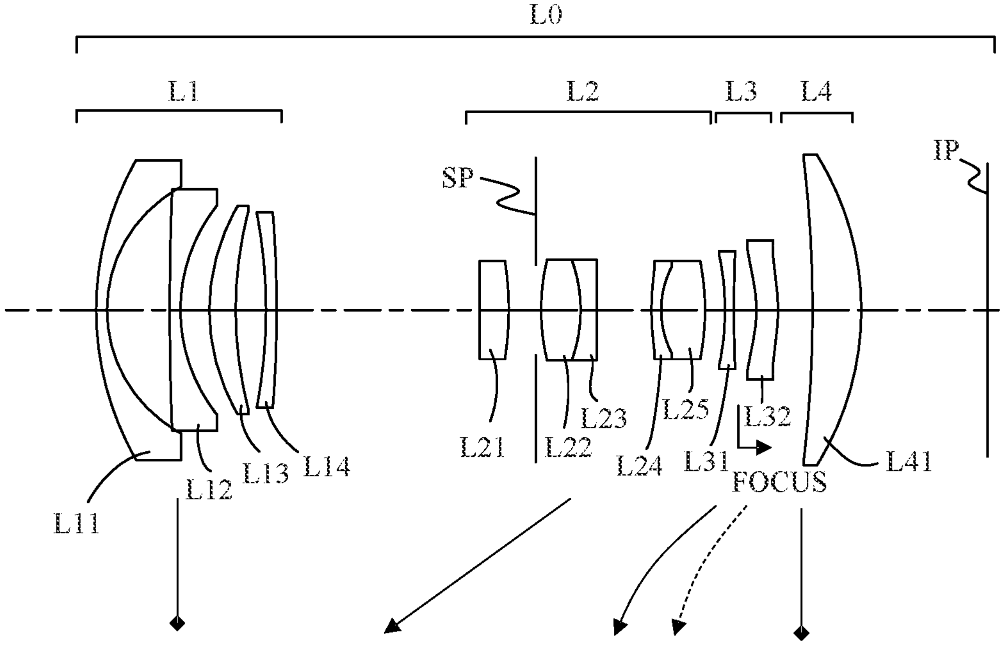
FIG. 7 is a sectional view of a zoom lens according to Example 4.
Figure 8A:
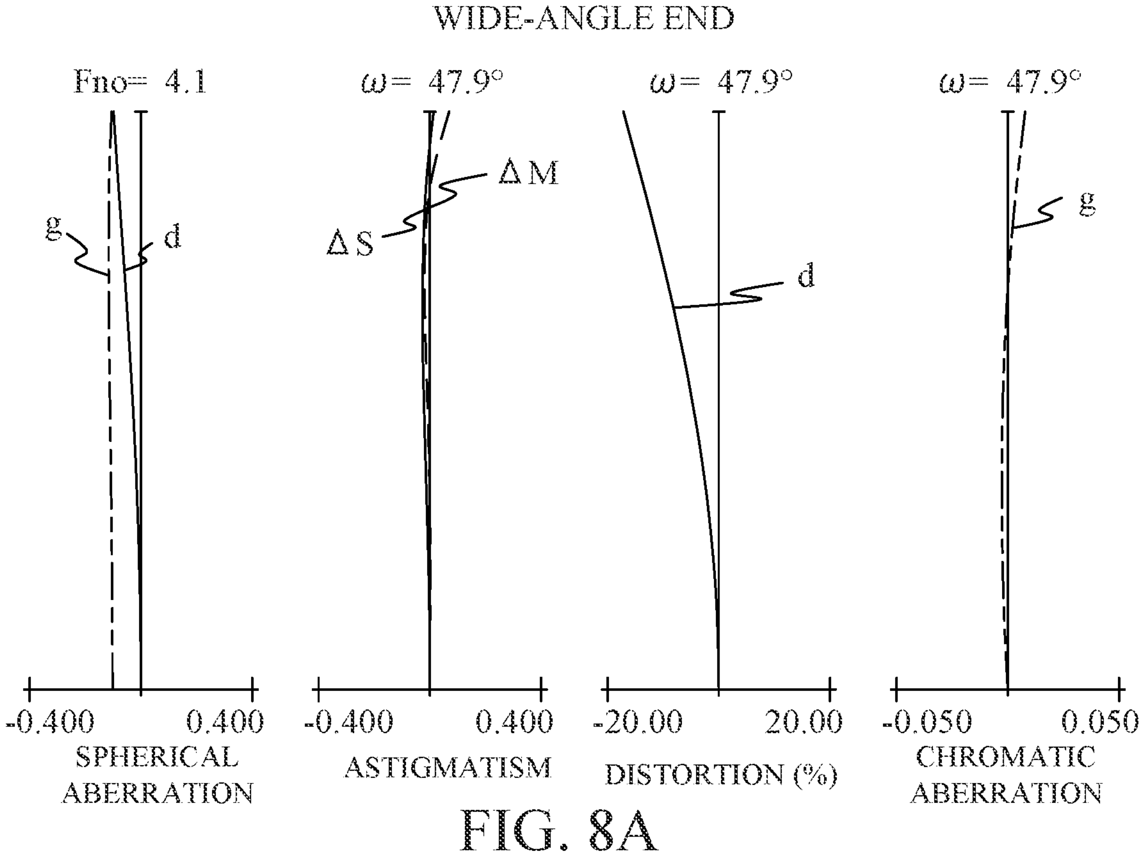
FIGS. 8A and 8B are aberration diagrams of the zoom lens according to Example 4.
Figure 8B:
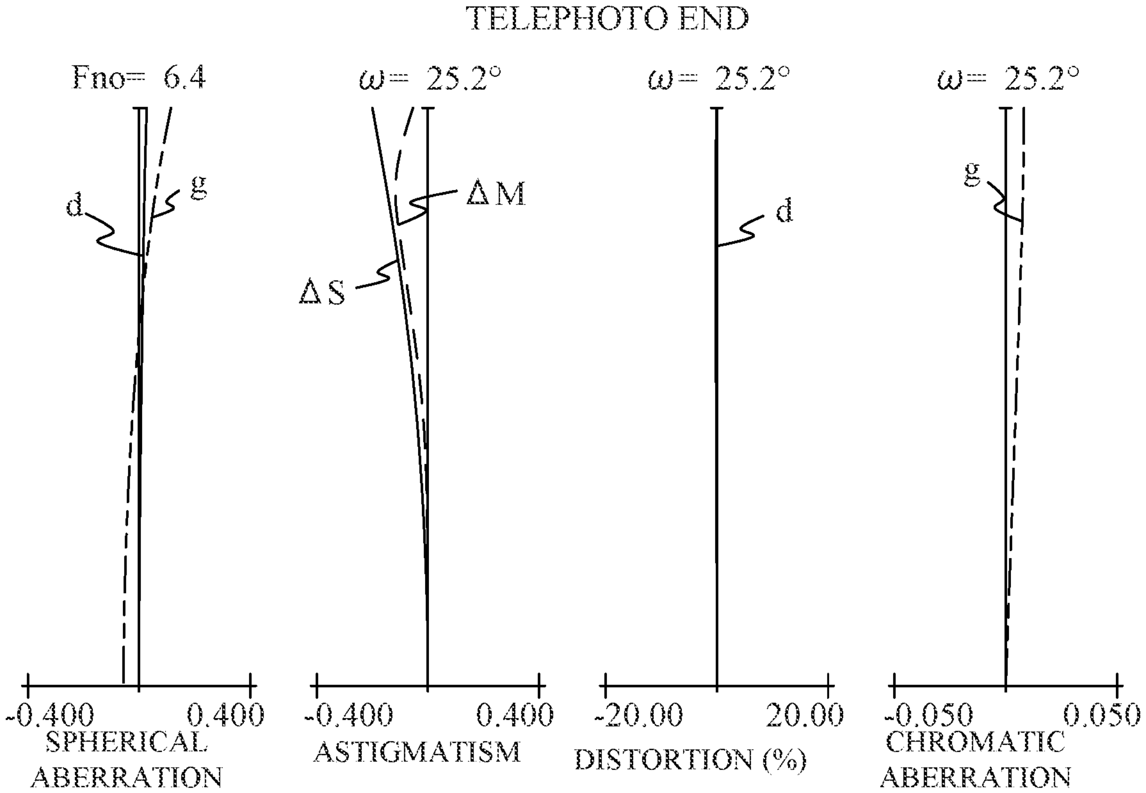
Figure 9:
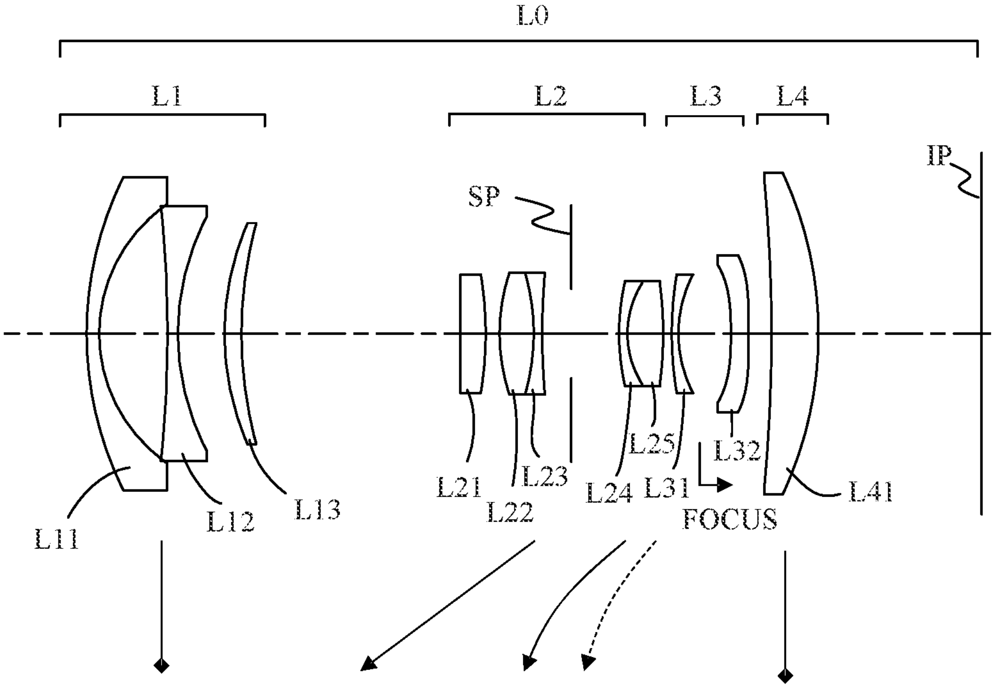
FIG. 9 is a sectional view of a zoom lens according to Example 5.
Figure 10A:
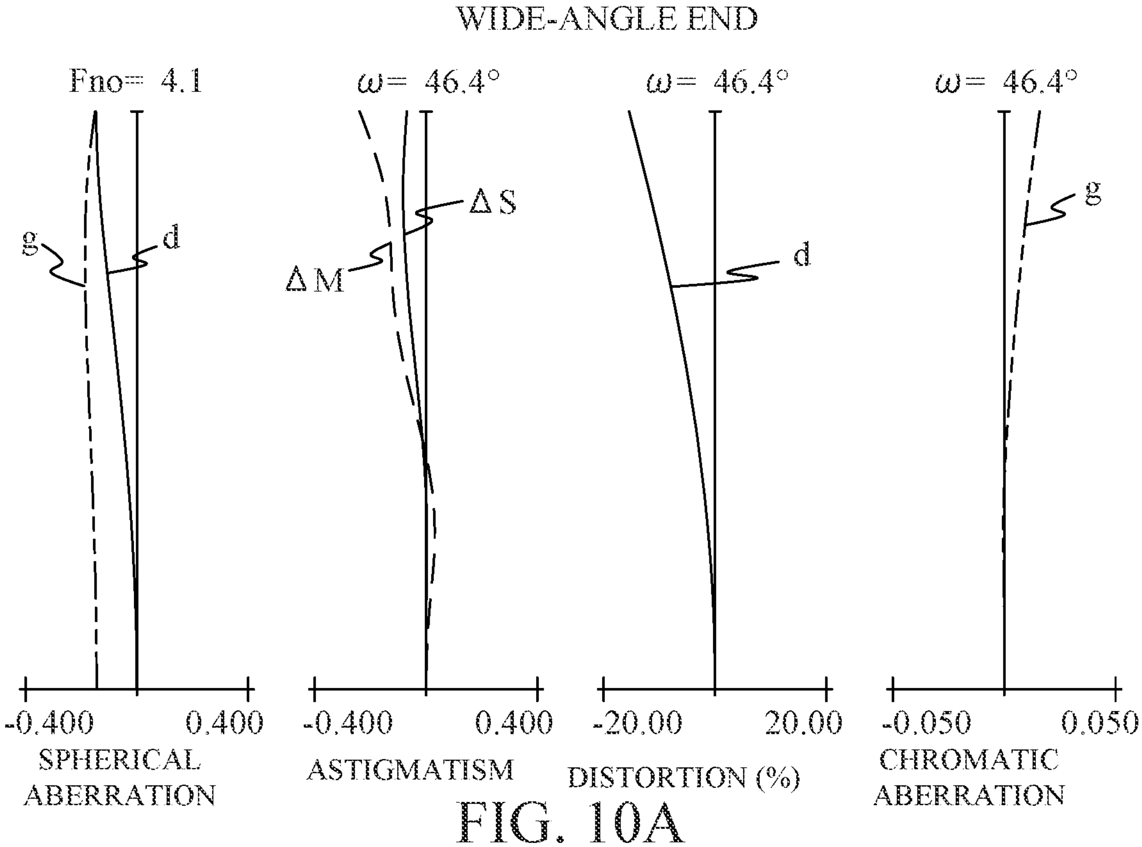
FIGS. 10A and 10B are aberration diagrams of the zoom lens according to Example 5.
Figure 10B:
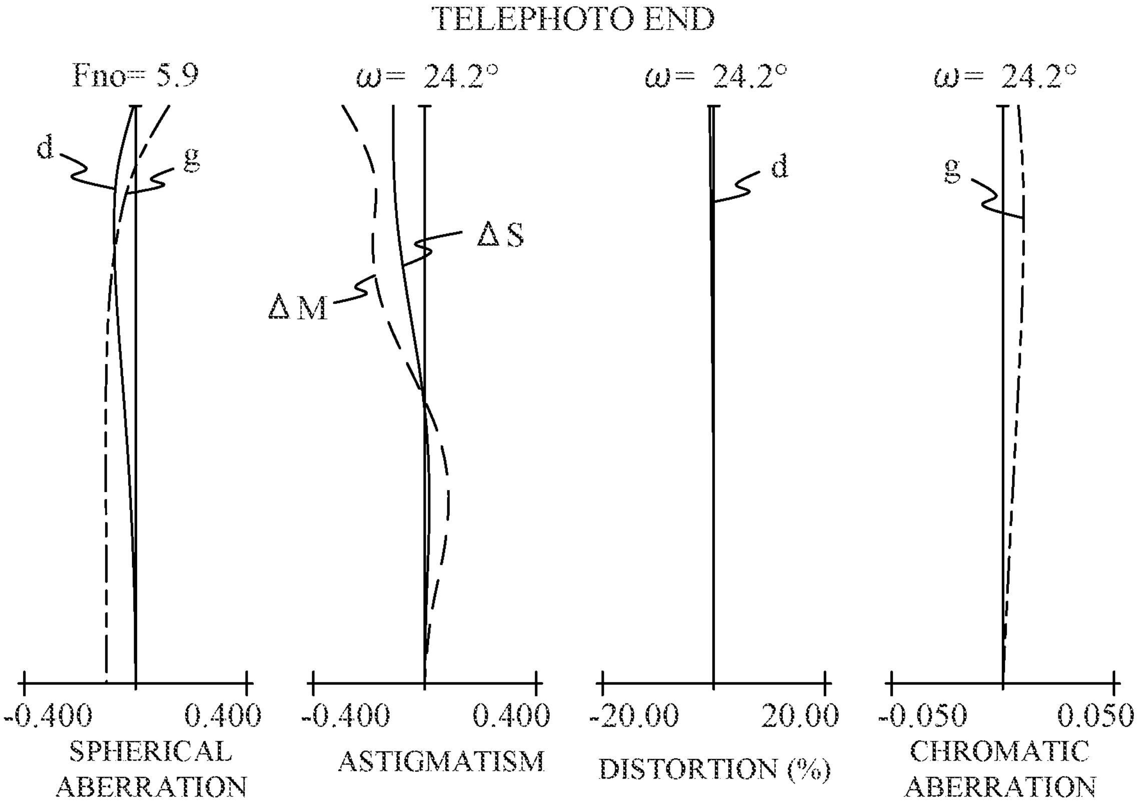

Referring now to the accompanying drawings, a description will be given of a zoom lens according to this example and an image pickup apparatus and an image pickup system each having the zoom lens.

FIGS. 1, 3, 5, 7, and 9 are lens sectional views of zoom lenses according to Examples 1 to 5, respectively, in in-focus states at infinity at a wide-angle end. The zoom lens according to each example is a zoom lens for an image pickup apparatus such as a digital still camera, a film-based camera, a digital video camera, a surveillance camera, a broadcasting camera, and an on-board camera (in-vehicle camera). The zoom lens according to each example can also be used as a projection optical system for a projection apparatus (projector).

In each lens sectional view, a left side is an object side (front) and a right side is an image side (back). The zoom lens according to each example includes a plurality of lens units. In this specification, a lens unit is a group of lenses that move or stand still during zooming. That is, in the zoom lens according to each example, a distance between adjacent lens units changes during zooming from the wide-angle end to the telephoto end. The lens unit includes one or more lenses. The lens unit may include an aperture stop.

In each lens sectional view, Li represents an i-th (i is a natural number) lens unit counted from the object side in the zoom lens.

SP denotes the aperture stop. The aperture stop SP determines (limits) a light beam of the maximum aperture F-number (Fno). IP denotes an image plane, and in a case where the zoom lens according to each example is used as an imaging optical system of a digital still camera or video camera, an imaging plane of a solid-state image sensor (photoelectric conversion element) such as a CCD sensor or CMOS sensor is disposed on the image plane IP. In a case where the zoom lens according to each example is used as an imaging optical system of a film-based camera, a photosensitive plane corresponding to the film plane is placed on the image plane IP.

An arrow in the optical axis direction indicates a moving direction of the focus lens unit during focusing from infinity to the shortest distance (closest distance). A solid-line arrow illustrated below each lens unit indicates a moving locus of each lens unit during zooming from the wide-angle end to the telephoto end during focusing on an object at infinity (infinity object). A dotted arrow illustrated below a predetermined lens unit indicates a moving locus of the predetermined lens unit during zooming from the wide-angle end to the telephoto end during focusing on the shortest distance object.

In each of the following examples, the wide-angle end and the telephoto end refer to zoom positions where the lens unit for zooming is mechanically located at both ends of a movable range on the optical axis.

FIGS. 2A, 2B, 4A, 4B, 6A, 6B, 8A, 8B, 10A, and 10B are aberration diagrams of the zoom lenses according to Examples 1 to 5, respectively in the in-focus states at infinity. FIGS. 2A, 4A, 6A, 8A, and 10A illustrate the aberration diagrams at the wide-angle end, and FIGS. 2B, 4B, 6B, 8B, and 10B illustrate the aberration diagrams at the telephoto end.

In a spherical aberration diagram, Fno denotes an F-number. The spherical aberration diagram illustrates spherical aberration amounts for the d-line (wavelength 587.6 nm) and g-line (wavelength 435.8 nm). In an astigmatism diagram, ΔS indicates an astigmatism amount on a sagittal image plane, and ΔM indicates an astigmatism amount on a meridional image plane. A distortion diagram illustrates a distortion amount for the d-line. A chromatic aberration diagram illustrates a chromatic aberration amount for the g-line. ω denotes a half angle of view (°) (angle of view in paraxial calculation) and indicates the angle of view according to a ray tracing value.

A description will now be given of the characteristic configuration of the zoom lens according to each example.

The zoom lens L0 according to each example includes, in order from the object side to the image side, a first lens unit L1 having negative refractive power (optical power=reciprocal of focal length), a second lens unit L2 having positive refractive power, a third lens unit L3 having negative refractive power, and a fourth lens unit L4 having positive refractive power. In the zoom lens L0 according to each example, a distance between adjacent lens units changes during zooming from the wide-angle end to the telephoto end. During zooming from the wide-angle end to the telephoto end, the first lens unit L1 and the fourth lens unit L4 are fixed relative to the image plane IP. The first lens unit L1, which has a large lens diameter and is located closest to the object, and the fourth lens unit L4, which is located closest to the image plane, are fixed relative to the image plane IP, and the second lens unit L2 and the third lens unit L3 having relatively small lens diameters are moved during zooming. Thereby, the zoom lens L0 that realizes a high-speed zoom operation can be acquired.

In the zoom lens L0 according to each example, the first lens unit L1 is fixed relative to the image plane IP during focusing from infinity to the shortest distance. Fixing the first lens unit L1 having the large lens diameter and disposed closest to the object during focusing can simplify a driving mechanism, and reduce the size of the zoom lens L0.

In the zoom lens L0 according to each example, the third lens unit L3 moves toward the object side during zooming from the wide-angle end to the telephoto end. Moving the third lens unit L3 to a position away from the image plane IP at the telephoto end can easily reduce the lens diameter of the third lens unit L3 and easily reduce the size and weight of the zoom lens L0.

In the zoom lens L0 according to each example, the second lens unit L2 includes four or more lenses, and these four or more lenses are all spherical lenses. In the lens in the second lens unit L2, the on-axis ray height tends to be high, and the required accuracy tends to be high. Therefore, configuring the second lens unit L2 only with spherical lenses can easily obtain the zoom lens L0 that is easy to manufacture and less expensive. In a case where the second lens unit L2 consists of spherical lenses, it is important to properly set the configuration of the second lens unit L2 in order to suppress aberrations in the second lens unit L2. In the zoom lens L0 according to each example, configuring the second lens unit L2 with four or more lenses can easily correct aberration fluctuations, especially spherical aberration and longitudinal chromatic aberration, during zooming.

The zoom lens L0 according to each example satisfies the following inequalities (1) and (2).

$$0.7<-f1/f2<1.5 \quad (1)$$

$$0.1<-f2/f3<0.9 \quad (2)$$

where f1 is a focal length of the first lens unit L1, f2 is a focal length of the second lens unit L2, and f3 is a focal length of the third lens unit L3.

Inequality (1) defines a relationship between the focal length f1 of the first lens unit L1 and the focal length f2 of the second lens unit L2. In a case where the value of −f1/f2 becomes higher than the upper limit of inequality (1), it becomes difficult to suppress the diameter of the front lens, and the zoom lens L0 becomes large. In a case where the value of −f1/f2 becomes lower than the lower limit of inequality (1), it becomes difficult to correct distortion at the wide-angle end.

Inequality (2) defines a relationship between the focal length f2 of the second lens unit L2 and the focal length f3 of the third lens unit L3. In a case where the value of −f2/f3 becomes higher than the upper limit of inequality (2), it becomes difficult to correct the Petzval sum, the curvature of field becomes large, and high image quality becomes difficult. In a case where the value of −f2/f3 becomes lower than the lower limit of inequality (2), it becomes difficult to correct aberrations occurring in the second lens unit L2, in particular it becomes difficult to correct spherical aberration and astigmatism due to zoom fluctuation, and high image quality becomes difficult.

Inequalities (1) to (2) may be replaced with inequalities (1a) to (2a) below.

$$0.85<-f1/f2<1.38 \quad (1a)$$

$$0.17<-f2/f3<0.82 \quad (2a)$$

Inequalities (1) to (2) may be replaced with inequalities (1b) to (2b) below.

$$0.92<-f1/f2<1.32 \quad (1b)$$

$$0.2<-f2/f3<0.78 \quad (2b)$$

A description will now be given of the configuration that may be satisfied in the zoom lens L0 according to each example.

In the zoom lens L0 according to each example, the first lens unit L1 may include two negative lenses and one positive lens. Thereby, it becomes easy to satisfactorily correct lateral chromatic aberration and coma at the wide-angle end.

In the zoom lens L0 according to each example, the first lens unit L1 may include a negative meniscus lens with a lens surface that is convex on the object side and disposed closest to the object in the first lens unit L1. Thereby, it becomes easy to satisfactorily correct distortion at the wide-angle end.

In the zoom lens L0 according to each example, the second lens unit L2 may include a positive lens located closest to the object in the second lens unit L2. Thereby, shortening the overall length becomes easy.

In the zoom lens L0 according to each example, the second lens unit L2 may include four or five lenses. Thereby, it becomes easy to suppress fluctuations in spherical aberration, longitudinal chromatic aberration, and lateral chromatic aberration during zooming (magnification variation).

In the zoom lens L0 according to each example, the second lens unit L2 may include three positive lenses and one biconcave lens. Three positive lenses and dispersing the power can easily correct various aberrations, or particularly suppress the zoom fluctuation of astigmatism and spherical aberration. A single biconcave lens can easily suppress the zoom fluctuation in longitudinal chromatic aberration, spherical aberration, astigmatism, and lateral chromatic aberration.

In the zoom lens L0 according to each example, the second lens unit L2 may include three positive lenses, one negative lens (first negative lens) having a lens surface that is concave on the object side, and one negative lens (second negative lens) with a lens surface that is concave on the image side and disposed on the image side of the first negative lens. The three positive lenses and dispersing the power can easily correct various aberrations, or particularly suppress the zoom fluctuation of astigmatism and spherical aberration. The single negative lens with a lens surface that is convex on the object side can easily suppress the zoom fluctuation due to spherical aberration and longitudinal chromatic aberration. The single negative lens with a lens surface that is concave on the image side of the negative lens with a lens surface that is concave on the object side can easily suppress the zoom fluctuation in astigmatism and lateral chromatic aberration.

In the zoom lens L0 according to each embodiment, the second lens unit L2 may include an aperture stop SP, and the second lens unit L2 and the aperture stop SP may integrally move during zooming from the wide-angle end to the telephoto end. Moving the aperture stop SP integrally with the second lens unit L2 that moves during zooming can easily optimize the balance of aberration correction before and after the aperture stop SP, and realize high image quality.

In the zoom lens L0 according to each example, the third lens unit L3 may include a lens having negative refractive power that is disposed closest to the object in the third lens unit L3. The negative lens closest to the object in the third lens unit L3 can easily shorten the overall length of the zoom lens L0, and reduce the size and weight of the zoom lens L0.

In the zoom lens L0 according to each example, the third lens unit L3 may include two or fewer lenses. The third lens unit L3 having two or fewer lenses can easily suppress the mass of the third lens unit L3, and easily realize a high-speed zoom operation.

In the zoom lens L0 according to each example, the third lens unit L3 may include a lens having an aspheric lens surface with negative refractive power that is stronger at the peripheral portion than at the central portion. The third lens unit L3 having the lens with the aspheric lens surface that has negative refractive power that is stronger at the peripheral portion can correct various aberrations, especially distortion at the wide-angle end, and realize higher image quality.

In the zoom lens L0 according to each example, the third lens unit L3 may move toward the image side during focusing from infinity to the shortest distance. Moving the third lens unit L3, which has a relatively small lens diameter and is lightweight, during focusing can simplify the driving mechanism and easily reduce the size of the zoom lens L0. The second lens unit L2 may be fixed during focusing.

In the zoom lens L0 according to each example, the fourth lens unit L4 may include two or fewer lenses. Since the fourth lens unit L4 is close to the image plane IP, in a case where the number of lenses in the fourth lens unit L4 increases, flare and ghost tend to occur, and it becomes difficult to achieve high image quality.

A description will now be given of the conditions that the zoom lens L0 according to each example may satisfy. The zoom lens L0 according to each example may satisfy one or more of the following inequalities (3) to (8):

$$0.4<-T1/f1<1.0 \quad (3)$$

$$0.1<-f1/f4<0.8 \quad (4)$$

$$0.05<BFw/Lw<0.30 \quad (5)$$

$$1.1<-f1/fw<1.8 \quad (6)$$

$$0.5<M2/fw<2.0 \quad (7)$$

$$0.4<M3/fw<1.6 \quad (8)$$

Here, T1 is a distance on the optical axis from a lens surface closest to the object of the first lens unit L1 to a lens surface closest to the image plane of the first lens unit L1. f4 is a focal length of the fourth lens unit L4. BFw is a back focus of the zoom lens L0 in the in-focus state at infinity at the wide-angle end. Lw is a distance on the optical axis from a lens surface closest to the object of the zoom lens L0 at the wide-angle end to the image plane IP. fw is a focal length of the zoom lens L0 in the in-focus state at infinity at the wide-angle end. M2 is a moving amount of the second lens unit L2 during zooming from the wide-angle end to the telephoto end. The moving amount is set to have a positive value in a moving direction toward the object side during zooming from the wide-angle end to the telephoto end. fw is a focal length of the zoom lens L0 in the in-focus state at infinity at the wide-angle end. M3 is a moving amount of the third lens unit L3 during zooming from the wide-angle end to the telephoto end. The moving amount is set to have a positive value in a moving direction toward the object side during zooming from the wide-angle end to the telephoto end.

Inequality (3) defines a relationship between the focal length f1 of the first lens unit L1 and the thickness T1 of the first lens unit L1. In a case where the value of −T1/f1 becomes higher than the upper limit of inequality (3), the zoom lens L0 becomes large. In a case where the value of −T1/f1 becomes lower than the lower limit of inequality (3), it becomes difficult to correct various aberrations, particularly to suppress the zoom fluctuation of coma.

Inequality (4) defines a relationship between the focal length f1 of the first lens unit L1 and the focal length f4 of the fourth lens unit L4. In a case where the value of −f1/f4 becomes higher than the upper limit of inequality (4), the aberration generated in the fourth lens unit L4 becomes significant, especially the astigmatism at the wide-angle end becomes significant, and it becomes difficult to achieve high image quality. In a case where the value of −f1/f4 becomes lower limit of inequality (4), it becomes difficult to correct the Petzval sum, the curvature of field at the wide-angle end especially becomes significant, and high image quality becomes difficult.

Inequality (5) defines a relationship between the back focus BFw at the wide-angle end and the overall lens length Lw at the wide-angle end. Here, the back focus is an air conversion value of the distance on the optical axis from the final lens surface (surface closest to the image plane) of the zoom lens L0 to the image plane IP. The overall lens length of the zoom lens L0 is a value obtained by adding the back focus to the distance from the first lens surface to the final lens surface. In a case where the value of BFw/Lw become higher than the upper limit of inequality (5), the zoom lens L0 becomes large. In a case where the value of BFw/Lw becomes lower than the lower limit of inequality (5), the on-axis ray height of the fourth lens unit L4 becomes small, the aberration correcting effect of the fourth lens unit L4 lowers, and it becomes difficult to correct coma at the telephoto end particularly.

Inequality (6) defines a relationship between the focal length f1 of the first lens unit L1 and the focal length fw of the zoom lens at the wide-angle end. In a case where the value of −f1/fw becomes higher than the upper limit of inequality (6), it becomes difficult to suppress the front lens diameter. In a case where the value of −f1/fw becomes lower than the lower limit of inequality (6), aberrations generated in the first lens unit L1 become significant, and the zoom fluctuation of coma in particular becomes significant.

Inequality (7) defines a relationship between the moving amount M2 of the second lens unit L2 during zooming and the focal length fw of the zoom lens L0 at the wide-angle end. In a case where the value of M2/fw becomes higher than the upper limit of inequality (7), the zoom lens L0 becomes large. In a case where the value of M2/fw becomes lower than the lower limit of inequality (7), it becomes difficult to increase the magnification variation of the zoom lens L0.

Inequality (8) defines a relationship between the moving amount M3 of the third lens unit L3 during zooming and the focal length fw of the zoom lens L0 at the wide-angle end. In a case where the value of M3/fw becomes higher than the upper limit of inequality (8), the zoom lens L0 becomes large. In a case where the value of M3/fw becomes lower than the lower limit of inequality (8), it becomes difficult to increase the magnification variation of the zoom lens L0.

Inequalities (3) to (8) may be replaced with inequalities (3a) to (8a) below:

$$0.50 < -T1/f1 < 0.96 \quad (3a)$$

$$0.21 < -f1/f4 < 0.62 \quad (4a)$$

$$0.09 < BFw/Lw < 0.24 \quad (5a)$$

$$1.19 < -f1/fw < 1.66 \quad (6a)$$

$$0.66 < M2/fw < 1.70 \quad (7a)$$

$$0.52 < M3/fw < 1.31 \quad (8a)$$

Inequalities (3) to (8) may be replaced with inequalities (3b) to (8b) below:

$$0.55 < -T1/f1 < 0.94 \quad (3b)$$

$$0.26 < -f1/f4 < 0.53 \quad (4b)$$

$$0.11 < BFw/Lw < 0.21 \quad (5b)$$

$$1.23 < -f1/fw < 1.59 \quad (6b)$$

$$0.74 < M2/fw < 1.55 \quad (7b)$$

$$0.58 < M3/fw < 1.17 \quad (8b)$$

A detailed description will now be given of the zoom lens L0 according to each example.

The zoom lens L0 according to Example 1 consists of, in order from the object side to the image side, a first lens unit L1 having negative refractive power, a second lens unit L2 having positive refractive power, a third lens unit L3 having negative refractive power, and a fourth lens unit L4 having positive refractive power. During zooming from the wide-angle end to the telephoto end, the first lens unit L1 and the fourth lens unit L4 are fixed relative to the image plane IP. During zooming from the wide-angle end to the telephoto end, the second lens unit L2 and the third lens unit L3 move toward the object side. The third lens unit L3 moves toward the image side during focusing from infinity to the shortest distance. The first lens unit L1 consists of, in order from the object side, a negative meniscus lens L11 with a lens surface that is convex on the object side, an aspheric lens L12 having a negative meniscus shape with a lens surface that is convex on the object side, a biconvex lens L13, and a negative meniscus lens L14 with a lens surface that is convex on the object side. The second lens unit L2 consists of, in order from the object side, a biconvex lens L21, an aperture stop SP, a positive meniscus lens L22 with a lens surface that is convex on the object, a biconcave lens L23, and a biconvex lens L24. The third lens unit L3 consists of an aspheric lens L31 having a negative meniscus shape with a lens surface that is convex on the image side. The aspheric lens L31 has aspherical surfaces on both sides where the object-side surface is an aspheric surface in which positive refractive power is stronger at the peripheral portion than at the central portion, and the image-side surface is an aspheric surface in which negative refractive power is stronger at the peripheral portion than at the central portion. The fourth lens unit L4 consists of a positive meniscus lens L41 with a lens surface that is convex on the image side.

The zoom lens L0 according to Example 2 consists of, in order from the object side to the image side, a first lens unit L1 having negative refractive power, a second lens unit L2 having positive refractive power, a third lens unit L3 having negative refractive power, and a fourth lens unit L4 having positive refractive power. During zooming from the wide-angle end to the telephoto end, the first lens unit L1 and the fourth lens unit L4 are fixed relative to the image plane IP. During zooming from the wide-angle end to the telephoto end, the second lens unit L2 and the third lens unit L3 move toward the object side. During focusing from infinity to the shortest distance, the third lens unit L3 moves toward the image side. The first lens unit L1 consists of, in order from the object side, a negative meniscus lens L11 with a lens surface that is convex on the object side, an aspheric lens L12 having a biconcave shape, and a biconvex lens L13. The second lens unit L2 consists of, in order from the object side, a positive meniscus lens L21 with a lens surface that is convex on the image side, a biconvex lens L22, a negative meniscus lens L23 with a lens surface that is concave on the object side, an aperture stop SP, a negative meniscus lens L24 with a lens surface that is concave on the image side, and a biconvex lens L25. A cemented lens is formed by the lenses L22 and L23. A cemented lens is formed by the lenses L24 and L25. The third lens unit L3 consists of, in order from the object side, a biconcave lens L31, and an aspheric lens L32 having a negative meniscus shape with a lens surface that is concave on the object side. The lens L32 has aspheric surfaces on both sides where the object-side surface is an aspherical surface in which positive refractive power is stronger at the peripheral portion than at the central portion, and the image-side surface is an aspherical surface in which negative refractive power is stronger at the peripheral portion than the central portion. The fourth lens unit L4 consists of a positive meniscus lens L41 with a lens surface that is convex on the image side.

The zoom lens L0 according to Example 3 consists of, in order from the object side to the image side, a first lens unit L1 having negative refractive power, a second lens unit L2 having positive refractive power, a third lens unit L3 having negative refractive power, and a fourth lens unit L4 having positive refractive power. During zooming from the wide-angle end to the telephoto end, the first lens unit L1 and the fourth lens unit L4 are fixed relative to the image plane IP. During zooming from the wide-angle end to the telephoto end, the second lens unit L2 and the third lens unit L3 move toward the object side. During focusing from infinity to the shortest distance, the third lens unit L3 moves toward the image side. The first lens unit L1 consists of, in order from the object side, a negative meniscus lens L11 with a lens surface that is convex on the object side, an aspheric lens L12 having a negative meniscus shape with a lens surface that is convex on the object side, and a positive meniscus lens L13 with a lens surface that is convex on the object side. The second lens unit L2 consists of, in order from the object side, a biconvex lens L21, an aperture stop SP, a positive meniscus lens L22 with a lens surface that is convex on the object side, a biconcave lens L23, and a biconvex lens L24. The third lens unit L3 consists of an aspheric lens L31 having a negative meniscus shape with a lens surface that is convex on the image side. The lens L31 has aspherical surfaces on both sides where the object-side surface is an aspherical surface in which positive refractive power is stronger at the peripheral portion than at the central portion, and the image-side surface is an aspherical surface in which negative refractive power is stronger at the peripheral portion than at the central portion. The fourth lens unit L4 consists of, in order from the object side, a biconcave lens L41 and a biconvex lens L42.

The zoom lens L0 according to Example 4 consists of, in order from the object side to the image side, a first lens unit L1 having negative refractive power, a second lens unit L2 having positive refractive power, a third lens unit L3 having negative refractive power, and a fourth lens unit L4 having positive refractive power. During zooming from the wide-angle end to the telephoto end, the first lens unit L1 and the fourth lens unit L4 are fixed relative to the image plane IP. During zooming from the wide-angle end to the telephoto end, the second lens unit L2 and the third lens unit L3 move toward the object side. During focusing from infinity to the shortest distance, the third lens unit L3 moves toward the image side. The first lens unit L1 consists of, in order from the object side, a negative meniscus lens L11 with a lens surface that is convex on the object side, a negative meniscus lens L12 with a lens surface that is convex on the object side, a positive meniscus lens L13 with a lens surface that is convex on the object side, and a negative meniscus lens L14 with a lens surface that is convex on the image side. The second lens unit L2 consists of, in order from the object side, a positive meniscus lens L21 with a lens surface that is convex on the image side, an aperture stop SP, a biconvex lens L22, a negative meniscus lens L23 with a lens surface that is concave on the object side, and a negative meniscus lens L24 with a lens surface that is concave on the image side, and a biconvex lens L25. A cemented lens is formed by the lenses L22 and L23. A cemented lens is formed by the lenses L24 and L25. The third lens unit L3 consists of, in order from the object side, a biconcave lens L31 and an aspheric lens L32 having a negative meniscus shape with a lens surface that is concave on the object side. The lens L32 has aspherical surfaces on both sides where the object-side surface is an aspherical surface in which positive refractive power is stronger at the peripheral portion than at the central portion, and the image-side surface is an aspherical surface in which negative refractive power is stronger at the peripheral portion than at the central portion. The fourth lens unit L4 consists of a positive meniscus lens L41 with a lens surface that is convex on the image side.

The zoom lens L0 according to Example 5 consists of, in order from the object side to the image side, a first lens unit L1 having negative refractive power, a second lens unit L2 having positive refractive power, a third lens unit L3 having negative refractive power, and a fourth lens unit L4 having positive refractive power. During zooming from the wide-angle end to the telephoto end, the first lens unit L1 and the fourth lens unit L4 are fixed relative to the image plane IP. During zooming from the wide-angle end to the telephoto end, the second lens unit L2 and the third lens unit L3 move toward the object side. During focusing from infinity to the shortest distance, the third lens unit L3 moves toward the image side. The first lens unit L1 consists of, in order from the object side, a negative meniscus lens L11 with a lens surface that is convex on the object side, a biconcave lens L12, and a positive meniscus lens L13 with a lens surface that is convex on the object side. The second lens unit L2 consists of, in order from the object side, a biconvex lens L21, a biconvex lens L22, a biconcave lens L23, an aperture stop SP, a negative meniscus lens L24 with a lens surface that is concave on the image side, and a biconvex lens L25. A cemented lens is formed by the lenses L22 and L23. A cemented lens is formed by the lenses L24 and L25. The third lens unit L3 consists of, in order from the object side, a negative meniscus lens L31 with a lens surface that is convex on the object side and an aspheric lens L32 having a negative meniscus shape with a lens surface that is convex on the image side. The lens L32 has aspherical surfaces on both sides where the object-side surface is an aspherical surface in which the negative refractive power is stronger at the peripheral portion than at the central portion, and the image-side surface is an aspherical surface in which positive refractive power is stronger at the peripheral portion than at the central portion. The fourth lens unit L4 consists of a positive meniscus lens L41 with a lens surface that is convex on the image side.

In the zoom lenses L0 according to Examples 1 to 5, all surfaces having refractive power are refractive surfaces. In comparison with a case where a surface having refractive power is formed by a diffractive optical element or a reflective surface, the surface can easily have optical performance equal to or higher than that with the diffractive optical element or the reflective surface, with a lower manufacturing difficulty.

The zoom lenses L0 according to Examples 1 to 5 have no optical element such as a prism that bends the optical path. The prism or the like for bending the optical path causes the lens to be thicker, and makes miniaturization difficult.

Numerical examples 1 to 5 corresponding to examples 1 to 5 will be illustrated below.

In surface data of each numerical example, r represent a radius of curvature of each optical surface, and d (mm) is an on-axis distance (distance on the optical axis) between an m-th surface and an (m+1)-th surface, where m is a surface number counted from the light incident side. nd represents a refractive index for the d-line of each optical element, and νd represents an Abbe number of the optical element based on the d-line. The Abbe number νd of a certain material is expressed as follows:

$$\nu d=(Nd-1)/(NF-NC)$$

where Nd, NF, and NC are refractive indices based on the d-line (587.6 nm), the F-line (486.1 nm), and the C-line (656.3 nm) in the Fraunhofer line, respectively.

In each numerical example, values of d, a focal length (mm), an F-number, and a half angle of view (°) are set in a case where the optical system according to each example is in an in-focus state on an infinity object. A back focus BF is a distance on the optical axis from the final lens surface (lens surface closest to the image plane) of the zoom lens L0 to the paraxial image surface expressed in air conversion length. The overall lens length of the zoom lens L0 is a length obtained by adding the back focus to a distance on the optical axis from the first lens surface (lens surface closest to the object) to the final lens surface. The lens unit includes one or more lenses.

In a case where the optical surface is aspherical, an asterisk * is attached to the right side of the surface number. The aspherical shape is expressed as follows:

$$X=(h^2/R)/[1+\{1-(1+K)(h/R)^2\}^{1/2}]+A4\times h^4+A6\times h^6+A8\times h^8+A10\times h^{10}+A12\times h^{12}$$

where X is a displacement amount from a surface vertex in the optical axis direction, h is a height from the optical axis in a direction orthogonal to the optical axis, a light traveling direction is set positive, R is a paraxial radius of curvature, K is a conic constant, and A4, A6, A8, A10, and A12 are aspheric coefficients. "e±XX" in each aspheric coefficient means "$\times 10^{\pm XX}$."

Numerical Example 1

UNIT: mm

SURFACE DATA

| Surface No | r | d | nd | νd |
|---|---|---|---|---|
| 1 | 114.124 | 1.00 | 1.77250 | 49.6 |
| 2 | 12.042 | | | 4.29 |
| 3* | 43.105 | 2.50 | 1.53110 | 55.9 |
| 4* | 20.966 | 1.99 | | |
| 5 | 35.204 | 2.90 | 1.77047 | 29.7 |
| 6 | −114.527 | 1.97 | | |
| 7 | −32.492 | 1.00 | 1.49700 | 81.5 |
| 8 | −70.456 | (variable) | | |
| 9 | 18.171 | 1.94 | 1.77250 | 49.6 |
| 10 | −529.066 | 2.48 | | |
| 11(aperture stop) | ∞ | 1.38 | | |
| 12 | 12.421 | 1.79 | 1.59282 | 68.6 |
| 13 | 44.069 | 0.36 | | |
| 14 | −46.037 | 1.00 | 1.68893 | 31.1 |
| 15 | 10.684 | 0.48 | | |
| 16 | 25.111 | 3.36 | 1.59282 | 68.6 |
| 17 | −21.982 | (variable) | | |
| 18* | −18.435 | 2.00 | 1.53110 | 55.9 |
| 19* | −32.813 | (variable) | | |
| 20 | −120.000 | 4.59 | 1.63854 | 55.4 |
| 21 | −29.908 | (variable) | | |
| Image Plane | ∞ | | | |

Aspheric Data

3rd Surface

K=0.00000e+00 A 4=−8.94309e-05 A 6=7.11824e-07 A 8=−3.52027e-09

4th Surface

K=0.00000e+00 A 4=−1.48535e-04 A 6=6.59805e-07 A 8=−5.15433e-09

18th Surface

K=0.00000e+00 A 4=2.68346e-04 A 6=2.81044e-06 A 8=−9.40023e-08

19th Surface

K=0.00000e+00 A 4=2.67097e-04 A 6=1.59679e-06 A 8=−5.11740e-08

VARIOUS DATA

ZOOM RATIO 2.02

| | WIDE | MIDDLE | TELE |
|---|---|---|---|
| Focal Length | 14.40 | 20.07 | 29.10 |
| Fno. | 4.10 | 5.05 | 6.40 |
| Half Angle of View (°) | 43.4 | 31.7 | 25.1 |
| Overall Lens Length | 75.06 | 75.06 | 75.06 |
| BF | 11.78 | 11.78 | 11.78 |

| | | | |
|---|---|---|---|
| d 8 | 16.11 | 8.43 | 0.74 |
| d 17 | 1.84 | 1.00 | 6.15 |
| d 19 | 10.29 | 18.81 | 21.35 |
| d 21 | 11.78 | 11.78 | 11.78 |

Lens Unit Data

| Lens Unit | Starting Surface | Focal Length |
|---|---|---|
| 1 | 1 | −21.90 |
| 2 | 9 | 19.73 |
| 3 | 18 | −83.23 |
| 4 | 20 | 61.17 |

Numerical Example 2

UNIT: mm

| SURFACE DATA | | | | |
|---|---|---|---|---|
| Surface No | r | d | nd | νd |
| 1 | 235.833 | 1.00 | 1.77250 | 49.6 |
| 2 | 10.085 | 4.16 | | |
| 3* | −895.559 | 2.50 | 1.53110 | 55.9 |
| 4* | 44.647 | 1.74 | | |
| 5 | 64.099 | 1.78 | 2.05090 | 26.9 |
| 6 | −162.178 | (variable) | | |
| 7 | −459.615 | 2.29 | 1.48749 | 70.2 |
| 8 | −33.943 | 4.00 | | |
| 9 | 18.560 | 3.57 | 1.69680 | 55.5 |
| 10 | −16.150 | 1.00 | 1.90043 | 37.4 |
| 11 | −62.644 | 1.84 | | |
| 12(aperture stop) | ∞ | 4.68 | | |
| 13 | 25.922 | 1.00 | 1.83481 | 42.7 |
| 14 | 8.456 | 4.21 | 1.49700 | 81.5 |
| 15 | −26.343 | (variable) | | |
| 16 | −34.878 | 0.80 | 1.61772 | 49.8 |
| 17 | 139.823 | 4.14 | | |
| 18* | −9.417 | 2.00 | 1.53110 | 55.9 |
| 19* | −12.991 | (variable) | | |
| 20 | −120.000 | 4.63 | 1.63854 | 55.4 |
| 21 | −24.348 | (variable) | | |
| Image Plane | ∞ | | | |

Aspheric Data

3rd Surface

K=0.00000e+00 A 4=−8.12193e-05 A 6=8.99724e-07 A 8=−1.19209e-08

4th Surface

K=0.00000e+00 A 4=−1.28410e-04 A 6=3.69150e-07 A 8=−1.09948e-08

18th Surface

K=0.00000e+00 A 4=2.77887e-04 A 6=6.15575e-06 A 8=−2.56537e-08

19th Surface

K=0.00000e+00 A 4=2.14784e-04 A 6=3.85389e-06 A 8=−2.47687e-08

| VARIOUS DATA | | | |
|---|---|---|---|
| ZOOM RATIO | 2.02 | | |
| | WIDE | MIDDLE | TELE |
| Focal Length | 14.40 | 20.23 | 29.10 |
| Fno. | 4.10 | 5.04 | 6.40 |
| Half Angle of View (°) | 43.3 | 31.8 | 25.1 |
| Overall Lens Length | 78.52 | 78.52 | 78.52 |
| BF | 11.50 | 11.50 | 11.50 |
| d 6 | 16.23 | 8.82 | 1.41 |
| d 15 | 1.45 | 2.48 | 6.02 |
| d 19 | 3.98 | 10.37 | 14.24 |
| d 21 | 11.50 | 11.50 | 11.50 |

| Lens Unit Data | | |
|---|---|---|
| Lens Unit | Starting Surface | Focal Length |
| 1 | 1 | −18.40 |
| 2 | 7 | 18.55 |
| 3 | 16 | −28.78 |
| 4 | 20 | 46.95 |

Numerical Example 3

UNIT: mm

| SURFACE DATA | | | | |
|---|---|---|---|---|
| Surface No | r | d | nd | νd |
| 1 | 121.561 | 1.00 | 1.77250 | 49.6 |
| 2 | 11.453 | 4.23 | | |
| 3* | 32.011 | 2.50 | 1.53110 | 55.9 |
| 4* | 17.762 | 2.60 | | |
| 5 | 35.611 | 3.92 | 1.84666 | 23.8 |
| 6 | 295.075 | (variable) | | |
| 7 | 21.604 | 5.36 | 1.77250 | 49.6 |
| 8 | −124.853 | 2.01 | | |
| 9(aperture stop) | ∞ | 1.38 | | |
| 10 | 12.132 | 1.83 | 1.60311 | 60.6 |
| 11 | 44.069 | 0.37 | | |
| 12 | −41.117 | 1.00 | 1.69895 | 30.1 |
| 13 | 11.231 | 0.53 | | |
| 14 | 23.494 | 3.51 | 1.59282 | 68.6 |
| 15 | −19.891 | (variable) | | |
| 16* | −28.509 | 2.00 | 1.58313 | 59.4 |
| 17* | −97.030 | (variable) | | |
| 18 | −2406.291 | 1.00 | 1.61800 | 63.4 |
| 19 | 51.440 | 5.98 | | |
| 20 | 56.259 | 6.10 | 1.63854 | 55.4 |
| 21 | −42.231 | (variable) | | |
| Image Plane | ∞ | | | |

Aspheric Data

3rd Surface

K=0.00000e+00 A 4=−1.30355e-04 A 6=8.21595e-07 A 8=−4.36076e-09

4th Surface

K=0.00000e+00 A 4=−2.09893e-04 A 6=7.93554e-07 A 8=−6.47934e-09

16th Surface

K=0.00000e+00 A 4=2.01749e-04 A 6=1.42226e-06 A 8=−3.81941e-08

17th Surface

K=0.00000e+00 A 4=2.13559e-04 A 6=9.56327e-07 A 8=−2.86682e-08

| VARIOUS DATA | | | |
|---|---|---|---|
| ZOOM RATIO | 2.02 | | |
| | WIDE | MIDDLE | TELE |
| Focal Length | 14.40 | 20.11 | 29.10 |
| Fno. | 4.10 | 5.05 | 6.40 |
| Half Angle of View | 43.4 | 32.0 | 24.9 |
| Overall Lens Length | 78.52 | 78.52 | 78.52 |
| BF | 13.95 | 13.95 | 13.95 |

| | | | |
|---|---|---|---|
| d 6 | 15.91 | 8.35 | 0.78 |
| d 15 | 1.52 | 1.00 | 5.75 |
| d 17 | 1.79 | 9.88 | 12.70 |
| d 21 | 13.95 | 13.95 | 13.95 |

| Lens Unit Data | | |
|---|---|---|
| Lens Unit | Starting Surface | Focal Length |
| 1 | 1 | −20.90 |
| 2 | 7 | 19.44 |
| 3 | 16 | −69.98 |
| 4 | 18 | 61.92 |

Numerical Example 4

UNIT: mm

| SURFACE DATA | | | | |
|---|---|---|---|---|
| Surface No | r | d | nd | νd |
| 1 | 28.261 | 1.00 | 1.83481 | 42.7 |
| 2 | 13.074 | 5.81 | | |
| 3 | 276.885 | 1.00 | 1.59282 | 68.6 |
| 4 | 15.738 | 2.68 | | |
| 5 | 19.172 | 2.44 | 1.85478 | 24.8 |
| 6 | 36.771 | 2.82 | | |
| 7 | −48.200 | 1.00 | 1.49700 | 81.5 |
| 8 | −108.437 | (variable) | | |
| 9 | −1511.954 | 2.69 | 1.48749 | 70.2 |
| 10 | −29.176 | 2.50 | | |
| 11(aperture stop) | ∞ | 0.50 | | |
| 12 | 20.250 | 3.66 | 1.83481 | 42.7 |
| 13 | −13.782 | 1.49 | 1.90366 | 31.3 |
| 14 | ∞ | 5.09 | | |
| 15 | 26.812 | 0.90 | 1.80400 | 46.5 |
| 16 | 8.906 | 4.06 | 1.49700 | 81.5 |
| 17 | −23.801 | (variable) | | |
| 18 | −23.372 | 0.80 | 1.60342 | 38.0 |
| 19 | 136.314 | 2.08 | | |
| 20* | −13.181 | 2.00 | 1.53110 | 55.9 |
| 21* | −18.384 | (variable) | | |
| 22 | −120.000 | 4.52 | 1.83481 | 42.7 |
| 23 | −27.562 | (variable) | | |
| Image Plane | ∞ | | | |

Aspheric Data

20th Surface

K=0.00000e+00 A 4=3.85197e-04 A 6=2.12676e-06 A 8=−1.60190e-08

21th Surface

K=0.00000e+00 A 4=3.61567e-04 A 6=1.65279e-06 A 8=−1.63872e-08

| VARIOUS DATA | | | |
|---|---|---|---|
| ZOOM RATIO | 2.35 | | |
| | WIDE | MIDDLE | TELE |
| Focal Length | 12.40 | 18.70 | 29.10 |
| Fno. | 4.10 | 5.13 | 6.40 |
| Half Angle of View (°) | 47.9 | 34.5 | 25.2 |
| Overall Lens Length | 82.67 | 82.67 | 82.67 |
| BF | 11.71 | 11.71 | 11.71 |

| | | | |
|---|---|---|---|
| d 8 | 18.82 | 10.10 | 1.38 |
| d 17 | 1.88 | 2.57 | 6.15 |
| d 21 | 3.22 | 11.26 | 16.40 |
| d 23 | 11.71 | 11.71 | 11.71 |

| Lens Unit Data | | |
|---|---|---|
| Lens Unit | Starting Surface | Focal Length |
| 1 | 1 | −18.16 |
| 2 | 9 | 17.28 |
| 3 | 18 | −25.13 |
| 4 | 22 | 41.93 |

Numerical Example 5

UNIT: mm

| SURFACE DATA | | | | |
|---|---|---|---|---|
| Surface No | r | d | nd | νd |
| 1 | 42.299 | 1.50 | 1.75500 | 52.3 |
| 2 | 18.914 | 8.16 | | |
| 3 | −142.144 | 1.20 | 1.59282 | 68.6 |
| 4 | 30.217 | 5.54 | | |
| 5 | 33.034 | 2.03 | 1.96300 | 24.1 |
| 6 | 50.217 | (variable) | | |
| 7 | 3588.151 | 3.04 | 1.53775 | 74.7 |
| 8 | −40.853 | 1.62 | | |
| 9 | 23.007 | 4.07 | 1.79952 | 42.2 |
| 10 | −26.519 | 1.01 | 1.95375 | 32.3 |
| 11 | 79.436 | 3.46 | | |
| 12(aperture stop) | ∞ | 5.69 | | |
| 13 | 28.102 | 1.00 | 1.85150 | 40.8 |
| 14 | 11.348 | 4.25 | 1.59522 | 67.7 |
| 15 | −45.381 | (variable) | | |
| 16 | 41.052 | 0.80 | 1.51742 | 52.4 |
| 17 | 15.294 | 6.27 | | |
| 18* | −51.838 | 2.10 | 1.53110 | 55.9 |
| 19* | −1006.304 | (variable) | | |
| 20 | −200.000 | 5.59 | 1.77250 | 49.6 |
| 21 | −45.565 | (variable) | | |
| Image Plane | ∞ | | | |

Aspheric Data

18th Surface

K=0.00000e+00 A 4=−2.18376e-04 A 6=8.06571e-07 A 8=−7.88304e-09

19th Surface

K=0.00000e+00 A 4=−1.88281e-04 A 6=7.88400e-07 A 8=−4.74781e-09

| VARIOUS DATA | | | |
|---|---|---|---|
| ZOOM RATIO | 2.35 | | |
| | WIDE | MIDDLE | TELE |
| Focal Length | 20.60 | 31.11 | 48.50 |
| Fno. | 4.10 | 5.20 | 5.88 |
| Half Angle of View (°) | 46.4 | 33.2 | 24.2 |
| Overall Lens Length | 106.52 | 106.52 | 106.52 |
| BF | 19.41 | 19.41 | 19.41 |

| | | | |
|---|---|---|---|
| d 6 | 26.05 | 13.88 | 1.70 |
| d 15 | 1.00 | 2.05 | 6.67 |
| d 19 | 2.72 | 13.84 | 21.40 |
| d 21 | 19.41 | 19.41 | 19.41 |

| Lens Unit Data | | |
|---|---|---|
| Lens Unit | Starting Surface | Focal Length |
| 1 | 1 | −28.51 |
| 2 | 7 | 23.49 |
| 3 | 16 | −31.34 |
| 4 | 20 | 75.20 |

TABLE 1 summarizes values corresponding to inequalities (1) to (8) in Examples 1 to 5.

TABLE 1

| | Ex. 1 | Ex. 2 | Ex. 3 | Ex. 4 | Ex. 5 |
|---|---|---|---|---|---|
| Inequality (1) | 1.110 | 0.992 | 1.075 | 1.051 | 1.214 |
| Inequality (2) | 0.237 | 0.645 | 0.278 | 0.688 | 0.750 |
| Inequality (3) | 0.715 | 0.608 | 0.682 | 0.922 | 0.647 |
| Inequality (4) | 0.358 | 0.392 | 0.337 | 0.433 | 0.379 |
| Inequality (5) | 0.157 | 0.146 | 0.178 | 0.142 | 0.182 |
| Inequality (6) | 1.521 | 1.278 | 1.451 | 1.465 | 1.384 |
| Inequality (7) | 1.067 | 1.030 | 1.051 | 1.406 | 1.182 |
| Inequality (8) | 0.640 | 0.674 | 0.655 | 1.020 | 0.846 |

Image Pickup Apparatus

Figure 11:
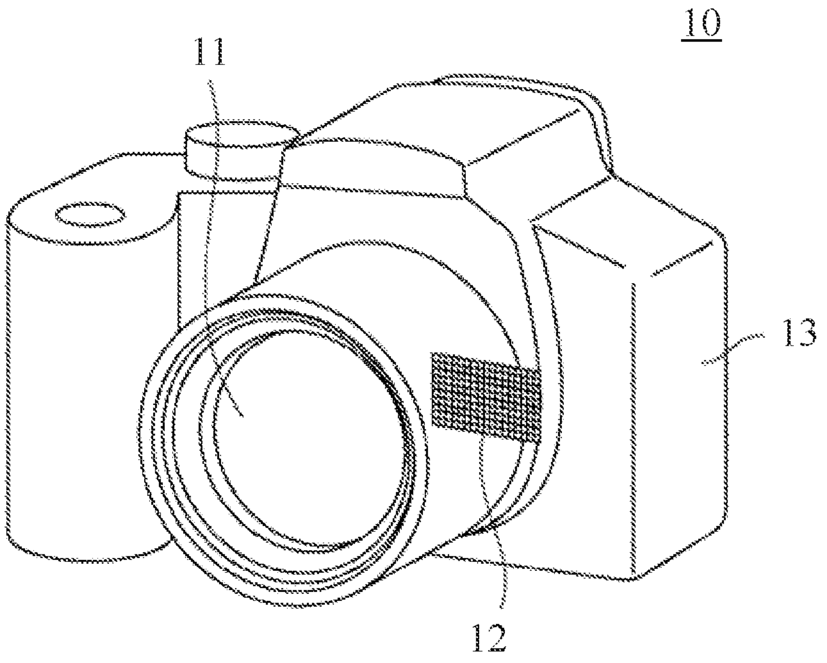
FIG. 11 is a schematic diagram of the image pickup apparatus.

Referring now to FIG. 11, a description will be given of an image pickup apparatus using the zoom lens L0 according to each example as an imaging optical system. FIG. 11 illustrates a configuration of an image pickup apparatus 10. The image pickup apparatus 10 includes a camera body 13, a lens apparatus 11 including the zoom lens L0 according to any one of Examples 1 to 5, and an image sensor (light receiving element) 12 configured to photoelectrically convert an image formed by the zoom lens L0. The image sensor 12 can use a CCD sensor or a CMOS sensor. The lens apparatus 11 and the camera body 13 may be integrated with each other, or may be detachably configured. The camera body 13 may be a so-called single-lens reflex camera having a quick turn mirror, or a so-called mirrorless camera without a quick turn mirror. The image pickup apparatus 10 according to this example can be small and lightweight, and have high optical performance.

The image pickup apparatus 10 according to this example is not limited to the digital still camera illustrated in FIG. 11, but is applicable to various image pickup apparatuses such as a broadcast camera, a film-based camera, a surveillance camera, and the like.

Image Pickup System

An image pickup system (surveillance camera system) may include the zoom lens according to any one of the above examples and a control unit configured to control the zoom lens. In this case, the control unit is configured to control the zoom lens so that each lens unit moves as described above during zooming, focusing, and image stabilization. The control unit does not have to be integrated with the zoom lens, and may be separate from the zoom lens. For example, a control unit (control apparatus) disposed remotely from a driving unit configured to drive each lens in the zoom lens may include a transmission unit configured to transmit a control signal (command) for controlling the zoom lens. This control unit can remotely control the zoom lens.

By providing an operation unit such as a controller and buttons for remotely operating the zoom lens to the control unit, the zoom lens may be controlled according to the user's input to the operation unit. For example, the operation unit may include an enlargement button and a reduction button. A signal may be sent from the control unit to the driving unit of the zoom lens L0 so that in a case where the user presses the enlargement button, the magnification of the zoom lens increases, and in a case where the user presses the reduction button, the magnification of the zoom lens decreases.

The image pickup system may include a display unit such as a liquid crystal panel configured to display information (movement state) about the zoom of the zoom lens. The information about the zoom of the zoom lens is, for example, the zoom magnification (zoom state) and a moving amount (moving state) of each lens unit. In this case, the user can remotely operate the zoom lens through the operation unit while viewing information about the zoom of the zoom lens displayed on the display unit. The display unit and the operation unit may be integrated by adopting a touch panel or the like.

While the disclosure has been described with reference to embodiments, it is to be understood that the disclosure is not limited to the disclosed embodiments. The scope of the following claims is to be accorded the broadest interpretation so as to encompass all such modifications and equivalent structures and functions.

Each example can provide a zoom lens that can achieve a compact size, reduced weight, high image quality, a short focal length at the wide-angle end, manufacturing easiness at low cost, and a high-speed zoom operation.

This application claims the benefit of Japanese Patent Application No. 2022-183286, filed on Nov. 16, 2022, which is hereby incorporated by reference herein in its entirety.

What is claimed is:

1. A zoom lens comprising a plurality of lens units that consist of, in order from an object side to an image side, a first lens unit having negative refractive power, a second lens unit having positive refractive power, a third lens unit having negative refractive power, and a fourth lens unit having positive refractive power, wherein a distance between adjacent lens units changes during zooming from a wide-angle end to a telephoto end, wherein during zooming from a wide-angle end to a telephoto end, the first lens unit and the fourth lens unit are fixed relative to an image plane, and the third lens unit moves to the object side, wherein during focusing from infinity to a shortest distance, the first lens unit is fixed relative to the image plane, wherein the second lens unit consists of four or more spherical lenses, and wherein the following inequalities are satisfied:

$$0.7<-f1/f2<1.5$$

$$0.1<-f2/f3<0.9$$

where f1 is a focal length of the first lens unit, f2 is a focal length of the second lens unit, and f3 is a focal length of the third lens unit.

2. The zoom lens according to claim 1, wherein the following inequality is satisfied:

$$0.4<-T1/f1<1.0$$

where T1 is a distance on an optical axis from a lens surface closest to an object of the first lens unit to a lens surface closest to the image plane of the first lens unit.

3. The zoom lens according to claim 1, wherein the following inequality is satisfied:

$$0.1<-f1/f4<0.8$$

where f4 is a focal length of the fourth lens unit.

4. The zoom lens according to claim 1, wherein the following inequality is satisfied:

$$0.05<BFw/Lw<0.30$$

where BFw is a back focus of the zoom lens at the wide-angle end, and Lw is a distance on an optical axis from a lens surface closest to an object of the zoom lens at the wide-angle end to the image plane.

5. The zoom lens according to claim 1, wherein the following inequality is satisfied:

$$1.1<-f1/fw<1.8$$

where fw is a focal length of the zoom lens at the wide-angle end.

6. The zoom lens according to claim 1, wherein the following inequality is satisfied:

$$0.5<M2/fw<2.0$$

where M2 is a moving amount of the second lens unit during zooming from the wide-angle end to the telephoto end, and fw is a focal length of the zoom lens at the wide-angle end.

7. The zoom lens according to claim 1, wherein the following inequality is satisfied:

$$0.4<M3/fw<1.6$$

where M3 is a moving amount of the third lens unit during zooming from the wide-angle end to the telephoto end, and fw is a focal length of the zoom lens at the wide-angle end.

8. The zoom lens according to claim 1, wherein the first lens unit includes two negative lenses and a positive lens.

9. The zoom lens according to claim 1, wherein the first lens unit includes a negative meniscus lens with a lens surface that is convex on the object side and disposed closest to an object in the first lens unit.

10. The zoom lens according to claim 1, wherein the second lens unit includes a positive lens disposed closest to an object in the second lens unit.

11. The zoom lens according to claim 1, wherein the second lens unit consists of four or five lenses.

12. The zoom lens according to claim 1, wherein the second lens unit includes three positive lenses and a biconcave lens.

13. The zoom lens according to claim 1, wherein the second lens unit includes three positive lenses, a first negative lens with a lens surface that is concave on the object side, and a second negative lens with a lens surface that is concave and disposed on the image side of the first negative lens.

14. The zoom lens according to claim 1, wherein the second lens unit includes an aperture stop, and the second lens unit and the aperture stop integrally move during zooming from the wide-angle end to the telephoto end.

15. The zoom lens according to claim 1, wherein the third lens unit includes a lens having negative refractive power and disposed closest to an object in the third lens unit.

16. The zoom lens according to claim 1, wherein the third lens unit consists of two or fewer lenses.

17. The zoom lens according to claim 1, wherein the third lens unit includes a lens with an aspheric lens surface having negative refractive power that is stronger at a peripheral portion than at a central portion.

18. The zoom lens according to claim 1, wherein the third lens unit moves during focusing from the infinity to the shortest distance.

19. The zoom lens according to claim 1, wherein the fourth lens unit consists of two or fewer lenses.

20. An image pickup apparatus comprising:

a zoom lens; and an image sensor configured to receive image light formed by the zoom lens, wherein the zoom lens comprising a plurality of lens units that consist of, in order from an object side to an image side, a first lens unit having negative refractive power, a second lens unit having positive refractive power, a third lens unit having negative refractive power, and a fourth lens unit having positive refractive power, wherein a distance between adjacent lens units changes during zooming from a wide-angle end to a telephoto end, wherein during zooming from a wide-angle end to a telephoto end, the first lens unit and the fourth lens unit are fixed relative to an image plane, and the third lens unit moves to the object side, wherein during focusing from infinity to a shortest distance, the first lens unit is fixed relative to the image plane, wherein the second lens unit consists of four or more spherical lenses, and wherein the following inequalities are satisfied:

$$0.7<-f1/f2<1.5$$

$$0.1<-f2/f3<0.9$$

where f1 is a focal length of the first lens unit, f2 is a focal length of the second lens unit, and f3 is a focal length of the third lens unit.

* * * * *